(12) United States Patent
Lehn

(10) Patent No.: US 9,318,968 B2
(45) Date of Patent: Apr. 19, 2016

(54) DC-DC CONVERTER CIRCUIT FOR HIGH INPUT-TO-OUTPUT VOLTAGE CONVERSION

(75) Inventor: Peter Waldemar Lehn, Toronto (CA)

(73) Assignee: UNIVERSITY OF TORONTO GOVERNING COUNCIL, Toronto (CA)

( * ) Notice: Subject to any disclaimer, the term of this patent is extended or adjusted under 35 U.S.C. 154(b) by 38 days.

(21) Appl. No.: 13/384,294

(22) PCT Filed: Feb. 18, 2011

(86) PCT No.: PCT/CA2011/000185
§ 371 (c)(1),
(2), (4) Date: Apr. 2, 2012

(87) PCT Pub. No.: WO2011/100827
PCT Pub. Date: Aug. 25, 2011

(65) Prior Publication Data
US 2012/0195074 A1    Aug. 2, 2012

Related U.S. Application Data

(60) Provisional application No. 61/305,590, filed on Feb. 18, 2010.

(51) Int. Cl.
*G05F 1/613*     (2006.01)
*H02M 3/335*    (2006.01)
(Continued)

(52) U.S. Cl.
CPC .............. *H02M 3/337* (2013.01); *H02M 3/155* (2013.01); *H02M 3/335* (2013.01); *H02M 2001/0058* (2013.01); *Y02B 70/1433* (2013.01); *Y02B 70/1491* (2013.01)

(58) Field of Classification Search
USPC ................. 323/223, 224, 226; 363/17, 21.02, 363/21.03, 136
See application file for complete search history.

(56) References Cited

U.S. PATENT DOCUMENTS 5,027,263 A * 6/1991 Harada et al. .................. 363/16
5,486,752 A    1/1996 Hua et al.
(Continued)

FOREIGN PATENT DOCUMENTS

| CN | 1264269 A | 8/2000 |
|---|---|---|
| WO | 2009109902 A2 | 9/2009 |
| WO | 2011100827 A1 | 8/2011 |

OTHER PUBLICATIONS

United States Patent and Trademark Office. Office Action dated Dec. 23, 2013, issued in corresponding U.S. Appl. No. 13/469,060.
(Continued)

*Primary Examiner* — Adolf Berhane
*Assistant Examiner* — Gary Nash
(74) *Attorney, Agent, or Firm* — Norton Rose Fulbright Canada LLP; David Ng

(57) ABSTRACT

The present invention provides a series of DC-DC converter circuit designs, and DC-DC converters based on such circuit design, that provide high input-to-output voltage conversion. The converters include a resonant tank and a means for interrupting the tank current to produce a near zero-loss "hold" state wherein zero current and/or zero voltage switching is provided, while providing control over the amount of power transfer. A resonant DC-DC converter for high voltage step-up ratio in accordance with the circuit design includes: (a) a low voltage DC-AC converter, (b) a resonant tank, (c) a high voltage AC-DC converter, (d) a (i) common ground on an input and an output without use of a transformer and/or (ii) a single high voltage controllable switch within the resonant tank.

19 Claims, 21 Drawing Sheets

(51) Int. Cl.
*H02M 7/521* (2006.01)
*H02M 3/337* (2006.01)
*H02M 3/155* (2006.01)
*H02M 1/00* (2007.01)

(56) References Cited

U.S. PATENT DOCUMENTS

| | | | | |
|---|---|---|---|---|
| 5,640,082 | A * | 6/1997 | Lusher et al. | 323/293 |
| 5,722,057 | A | 2/1998 | Wu | |
| 5,768,111 | A * | 6/1998 | Zaitsu | 363/15 |
| 5,774,351 | A * | 6/1998 | Hsieh et al. | 363/132 |
| 5,875,103 | A | 2/1999 | Bhagwat et al. | |
| 6,016,257 | A | 1/2000 | Chang et al. | |
| 6,304,461 | B1 * | 10/2001 | Walker | 363/17 |
| 6,344,979 | B1 | 2/2002 | Huang et al. | |
| 6,370,050 | B1 | 4/2002 | Peng et al. | |
| 6,711,533 | B1 * | 3/2004 | Aymard et al. | 703/13 |
| 6,989,997 | B2 * | 1/2006 | Xu et al. | 363/16 |
| 7,006,362 | B2 * | 2/2006 | Mizoguchi et al. | 363/16 |
| 2007/0047275 | A1 * | 3/2007 | Hesterman et al. | 363/95 |
| 2007/0064457 | A1 * | 3/2007 | Perreault et al. | 363/78 |
| 2007/0230228 | A1 * | 10/2007 | Mao | 363/89 |
| 2007/0236967 | A1 * | 10/2007 | Liu et al. | 363/21.02 |
| 2008/0089103 | A1 * | 4/2008 | Hsu et al. | 363/132 |
| 2008/0247194 | A1 | 10/2008 | Ying et al. | |
| 2008/0259647 | A1 * | 10/2008 | Risseeuw | 363/21.1 |
| 2009/0034298 | A1 | 2/2009 | Liu et al. | |
| 2009/0196080 | A1 | 8/2009 | Zhang et al. | |

OTHER PUBLICATIONS

Canadian Intellectual Property Office, Examination Report dated Feb. 19, 2015, issued in Canadian Patent Application No. 2,768,517.

State Intellectual Property Office, Office Action dated Jul. 16, 2014, issued on Chinese Patent Application No. 201180017205.5.

Patent Cooperation Treaty, International Search Report dated May 13, 2011, issued on PCT Application No. PCT/CA2011/000185.

WIPO, International Search Report dated Feb. 8, 2013, issued in corresponding International Patent Application No. PCT/CA2012/001021.

Canadian Intellectual Property Office, Office Action dated Nov. 15, 2013, issued in corresponding Canadian Patent Application No. 2,768,517.

United States Patent and Trademark Office, Office Action dated Dec. 23, 2013, issued in corresponding U.S. Appl. No. 13/469,060.

* cited by examiner

24

DC-DC CONVERTER CIRCUIT FOR HIGH INPUT-TO-OUTPUT VOLTAGE CONVERSION

FIELD OF THE INVENTION

This present invention relates generally to a power converting apparatus, and more specifically to a DC-DC converter for high input-to-output voltage conversion.

BACKGROUND TO THE INVENTION

Direct current (DC) architectures are well known, for example for the transmission and distribution of power. DC architectures generally provide efficient (low loss) distribution of electrical power relative to alternating current (AC) architectures.

The importance of DC architectures has increased because of factors including: (1) the reliance of computing and telecommunications equipment on DC input power; (2) the reliance of variable speed AC and DC drives on DC input power; and (3) the production of DC power by various renewable energy sources, such as photovoltaic solar panels.

The widespread use of DC architectures has also expanded the need for DC-DC power converter circuits. Moreover, there is a further need for DC-DC power converter circuits that are efficient and low cost.

Cost reduction is achieved in part by reducing the components of DC-DC power converters, for example by providing transformerless DC-DC converters. Two of the most common transformerless dc/dc converters are the buck converter 10, as shown in FIG. 1, for stepping down the voltage, and the boost converter 12, as shown in FIG. 2, for stepping up the voltage.

While both of these circuits are capable of achieving very high conversion efficiency when the input-to-output voltage ratio is near unity, their efficiency is less than optimal when the voltage ratio becomes high. Loss of efficiency, along with other operational problems, are caused by circuit parasitics, including such circuit effects as diode forward voltage drop, switch and diode conduction losses, switching losses, switch capacitances, inductor winding capacitance, and lead and trace inductances.

Furthermore, it is known in the prior art that boost converters in particular are susceptible to parasitic effects and high efficiency operation requires low step up ratios, e.g. 1:2 or 1:3. Higher step up ratios such as in the range of 1:10 or above are entirely impractical in light of cost and efficiency constraints, for example, as explained in N. Mohan, T. Undeland, W. Robbins, "Power electronics: converters, applications, and design," Wiley, 1995.

B. Buti, P. Bartal, I. Nagy, "Resonant boost converter operating above its resonant frequency," EPE, Dresden, 2005, is an example of a resonant DC-DC power converter, where a resonant tank is excited at its resonant frequency to achieve high step-up/step-down conversion ratios without the use of transformers. An H-bridge based resonant DC-DC power converter was proposed by (D. Jovcic, "Step-up MW dc-dc converter for MW size applications," Institute of Engineering Technology, paper IET-2009-407) and modified for enhanced modularity by A. Abbas and P. Lehn (A. Abbas, P. Lehn, "Power electronic circuits for high voltage dc to dc converters," University of Toronto, Invention disclosure RIS#10001913, 2009-03-31).

There are a number of disadvantages to these prior art topologies.

The converter disclosed in B. Buti, P. Bartal, I. Nagy, "Resonant boost converter operating above its resonant frequency," EPE, Dresden, 2005, requires two perfectly, or near to perfectly, matched inductors, each only utilized half of the time, to function properly. Perfect matching is not viable in many applications. Moreover, the fact that the inductor is only utilized half of the time effectively doubles the inductive requirements of the circuit. This is undesirable as the inductor is typically the single most expensive component in the power circuit. Furthermore, the converter in B. Buti, P. Bartal, I. Nagy, "Resonant boost converter operating above its resonant frequency," EPE, Dresden, 2005, requires both a positive and negative input supply. This is often not available.

The converters disclosed in D. Jovcic, "Step-up MW dc-dc converter for MW size applications," Institute of Engineering Technology, paper IET-2009-407, and A. Abbas, P. Lehn, "Power electronic circuits for high voltage dc to dc converters," University of Toronto, Invention disclosure RIS#10001913, 2009-03-31, use four high voltage reverse blocking switching devices. For medium frequency applications (approx. 20 kHz-100 kHz) such devices are not readily available thus they need to be created out of a series combination of an insulated-gate bipolar transistor ("IGBT") and a diode, or a MOSFET and a diode. This not only further increases system cost but it also nearly doubles the device conduction losses of the converter.

SUMMARY OF INVENTION

In one aspect the present invention is a resonant dc-dc converter for high voltage step-up ratio, characterized in that the resonant dc-dc converter for high voltage step-up ratio comprises: a low voltage full-bridge or half-bridge dc-ac converter; a resonant tank; a high voltage ac-dc rectifier; and a high voltage controllable switch within the resonant tank, said high voltage controllable switch being operable to interrupt current in the resonant tank by maintaining a high voltage across the switch.

In another aspect the present invention is a resonant dc-dc converter for high voltage step-up ratio, characterized in that the resonant dc-dc converter for high voltage step-up ratio comprises: a low voltage dc-ac converter; a resonant tank; a high voltage ac-dc converter; and one or more of the following: a common ground on an input and an output without use of a transformer; and a single high voltage controllable switch within the resonant tank.

In yet another aspect the present invention is a resonant dc-dc converter for high voltage step-up ratio, characterized in that the resonant dc-dc converter for high voltage step-up ratio comprises: a low voltage dc-ac converter; a resonant tank; a high voltage ac-dc converter; and a high voltage controllable switch within the resonant tank circuit; wherein the resonant dc-dc converter for high voltage step-up radio is operable to provide one or more of the following: (i) a common ground plane for input and output; and (ii) a transformer between input and output.

In still another aspect the present invention is a resonant dc-dc converter for high voltage step-up ratio, characterized in that the resonant dc-dc converter for high voltage step-up ratio comprises: a low voltage dc-ac converter; a resonant tank; a high voltage ac-dc converter; a high voltage controllable switch within a circuit of the resonant tank; and a common ground plane for an input and an output that does not require use of a transformer.

In another aspect the present invention is a resonant DC-DC converter, characterized in that the resonant DC-DC converter comprises: a transformerless DC-DC converter circuit being operable to provide high input to output voltage conversion, said transformerless DC-DC converter circuit including: a full-bridge converter on a low voltage side; a half-wave rectifier on a high voltage side; and a ground that is common to both input and output.

In still another aspect the present invention is a DC-DC converter with a transformer, characterized in that the DC-DC converter with a transformer comprises: a resonant tank; a high voltage switch, operable with a circuit of the DC-DC converter with a transformer to perform high voltage blocking of resonance by maintaining high voltage switch across the high voltage switch without reverse blocking; a full-bridge converter on a low voltage side; and an output rectifier on a high voltage side.

In another aspect the present invention is a resonant DC-DC step-up converter with a transformer that provides bi-polar output, characterized in that the DC-DC step-up converter comprises: a high voltage winding on the transformer; two half-wave rectifiers including the following: a first half-wave rectifier operable to supply current to a positive output voltage terminal; and a second half-wave rectifier operable to draw current from a negative output voltage terminal.

In yet another aspect the present invention is a resonant dc-dc converter provided for high voltage step-up ratio that comprises: (a) a low voltage dc-ac converter, (b) a resonant tank, (c) a high voltage ac-dc converter, and (d) a single high voltage controllable switch within the resonant tank. In embodiments of the present invention the single high voltage controllable switch may be two parallel MOSFETS, or a series of MOSFETS, operating in unison.

The converter circuit may be implemented without use of a transformer. The transformer may be included if desired and/ or in accordance with system requirements. For example a need for galvanic isolation could be addressed through the use of a transformer.

In another aspect the present invention is a resonant DC-DC converter comprising: a DC-DC converter circuit without a transformer that includes: (a) a full-bridge dc-ac converter on the low voltage side; (b) a half bridge ac-dc converter on the high voltage side; and (c) a ground that is common to both the input and the output, the converter circuit being operable to provide high input to output voltage conversion.

In yet another aspect of the invention, a resonant DC-DC converter circuit is provided comprising: a DC-DC converter circuit with a transformer that includes: (a) a full-bridge or half-bridge dc-ac converter on the low voltage side; (b) an ac-dc rectifier on the high voltage side; (c) a resonant tank; and (d) a high voltage switch that interrupts the main resonant tank current, the converter circuit being operable to enable the high voltage switch to perform high voltage blocking by the high voltage being maintained across the high voltage switch, with or without use of reverse blocking switch.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
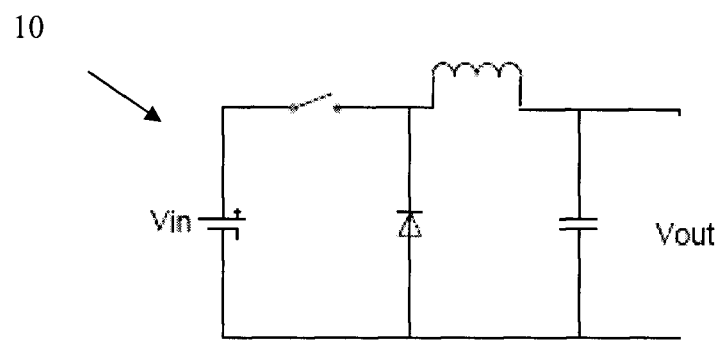
FIG. 1 is a circuit diagram illustrating a prior art buck converter.
Figure 2:
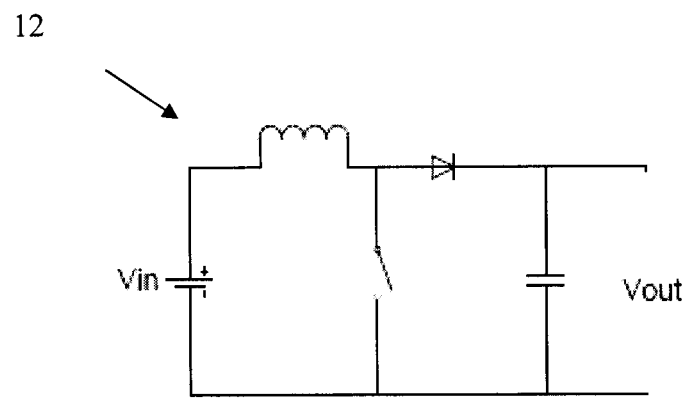
FIG. 2 is a circuit diagram illustrating a prior art boost converter.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

The invention is a resonant converter circuit design operable to achieve high input-to-output voltage conversion. In particular the invention may include a series of converter circuit topologies that provide high input-to-output voltage conversion and achieve high efficiency operation. The converter circuit topologies may include a resonant tank and a means for interrupting the tank current to produce a near zero-loss "hold" state wherein zero current and/or zero voltage switching is provided, while providing control over the amount of power transfer. Specifically the converter circuit topologies may control energy transfer by controlling the duration of the near zero-loss "hold". This energy power transfer control may be achieved using a single high voltage controllable switch.

The present invention may avoid unnecessary circulating current during low power operation, thereby reducing losses within the tank components and the low voltage DC/AC converter, and also reducing switching losses based on the zero voltage switching of the low voltage DC/AC converter and zero current switching of the low voltage DC/AC converter. Also, zero current switching of the high voltage controllable switch within the tank may be achieved and thereby keep its own switching losses low.

As described herein, the present invention may have several embodiments that present converter circuit topologies that provide high input-to-output voltage conversion and achieve high efficiency operation. Examples of these embodiments are disclosed herein, however a skilled reader will recognize that these examples do not limit the scope of the present invention and that other embodiments of the present invention may also be possible.

For clarity, the term "low voltage" is used in this disclosure to refer to components with voltage ratings comparable to that of the input, and the term "high voltage" is used in this disclosure to refer to components with voltage rating comparable to, or above, the peak voltage level seen across the resonant tank capacitor.

In embodiments of the present invention, appropriate implementation of the near zero-loss hold state, may cause zero voltage switching or zero current switching to be achieved for all controllable switches within the circuit.

Embodiments of the present invention may provide a lower loss converter circuit for high input-to-output voltage conversion ratio converters.

The circuit design of the present invention may include a variety of elements. In one embodiment these elements may include: (1) an input DC/AC converter; (2) a resonant tank; (3) a tank interruption means (such as a switch as described herein); and (4) an output rectifier. The output rectifier may, for example, include a filter inductor that limits the rate of rise of current in the output diode. Regarding the input DC/AC, a skilled reader will recognize that a number of different types of inverters may be suitable, for example, such as a half-bridge or full-bridge type inverter. A skilled reader will further recognize that the output rectifier may include any output rectifier stage, for example, such as a half-bridge or full-bridge rectifier. In some embodiments of the present invention, a transformer may be included in the circuit, prior to the output rectification stage.

In one embodiment of the present invention, the circuit design may be a circuit that includes: (1) a full-bridge DC/AC converter; (2) a resonant tank consisting of two L components and one C component; (3) a tank interruption switch; and (4) an output rectifier stage (full-bridge or half-bridge), wherein a common ground may be provided for both the input voltage and the output voltage. The circuit may, or may not, include a transformer. In an embodiment of the present invention wherein a full-bridge output rectifier is utilized a transformer may also be required. In an embodiment of the present invention that includes a transformer, the resonant L components may be integrated into the transformer design. Possible embodiments of the present invention that include such a circuit design are shown in FIGS. 5a to 5d.

As described herein, and as a skilled reader will recognize, embodiments of the present invention may include a transformer, or may be transformerless. The choice to include a transformer in an embodiment of the present invention may be based on specifications of the circuit of the embodiment of the present invention, or other preferences or considerations. This document discloses and describes some examples of both: embodiments of the present invention that include a transformer element; and embodiments of the present invention that do not include a transformer element, and therefore are transformerless.

Figure 11A:
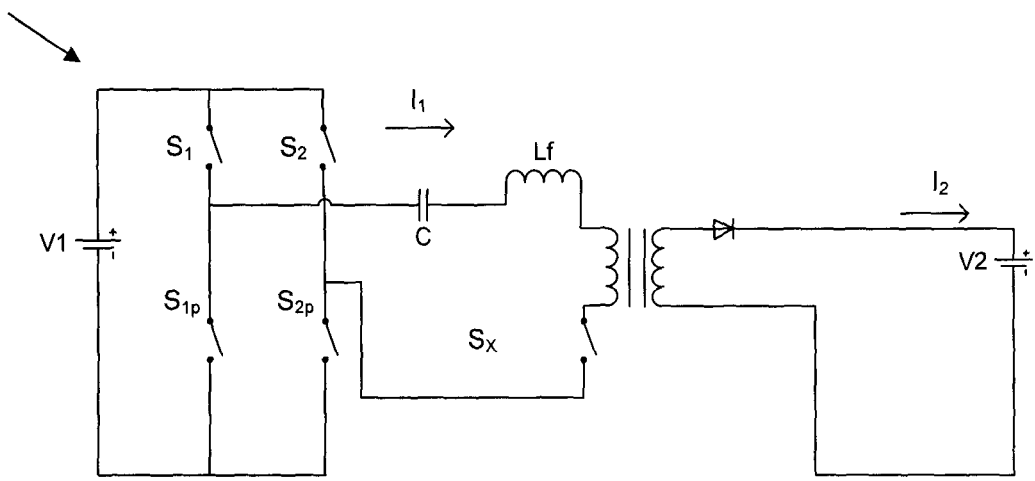
FIGS. 11a, 11b and 11c illustrate the three representative circuits of an alternate implementation of the circuit design of the present invention that include transformer.
Figure 11B:
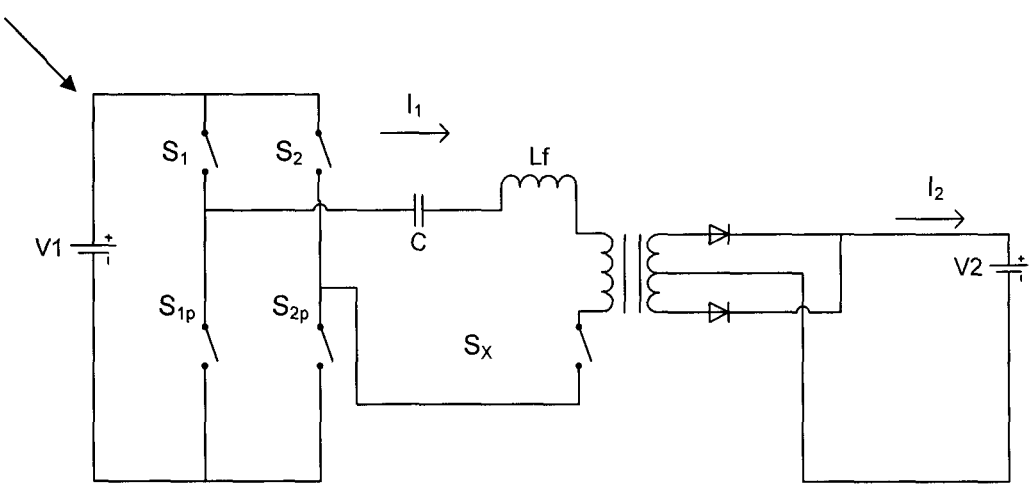
Figure 11C:
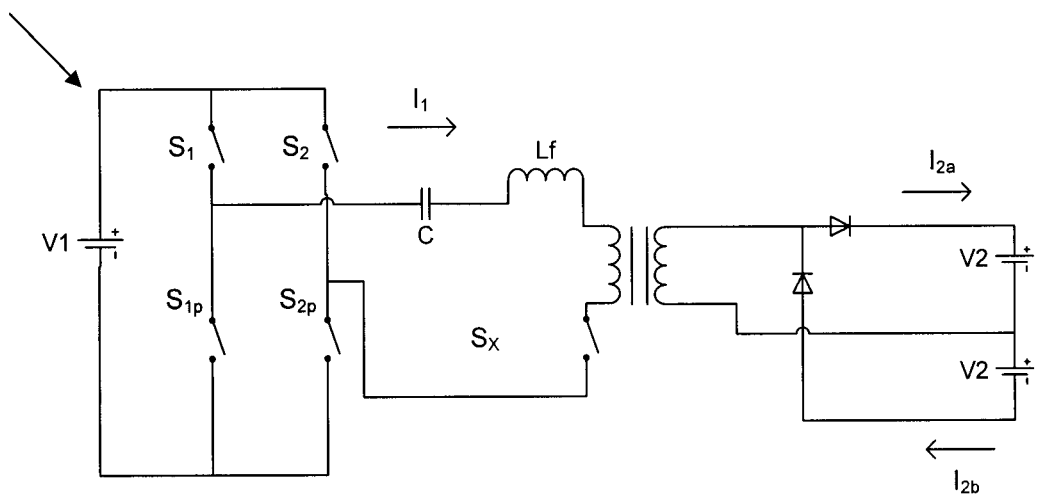

FIGS. 11a, 11b and 11c show embodiments of the present invention that are circuits 42, 44 and 46 respectively, that include an alternate implementation, wherein additional windings were added to the main inductor's magnetic core thus decreasing the voltage stress on switch Sx. The addition of windings may convert the inductor L into a transformer with isolation, which provides additional circuit implementation options. The embodiment of the present invention shown in FIG. 11c may provide bipolar output to allow a differential output voltage of 2×V2 to be achieved while maintaining a voltage to ground at level V2.

Figure 12:
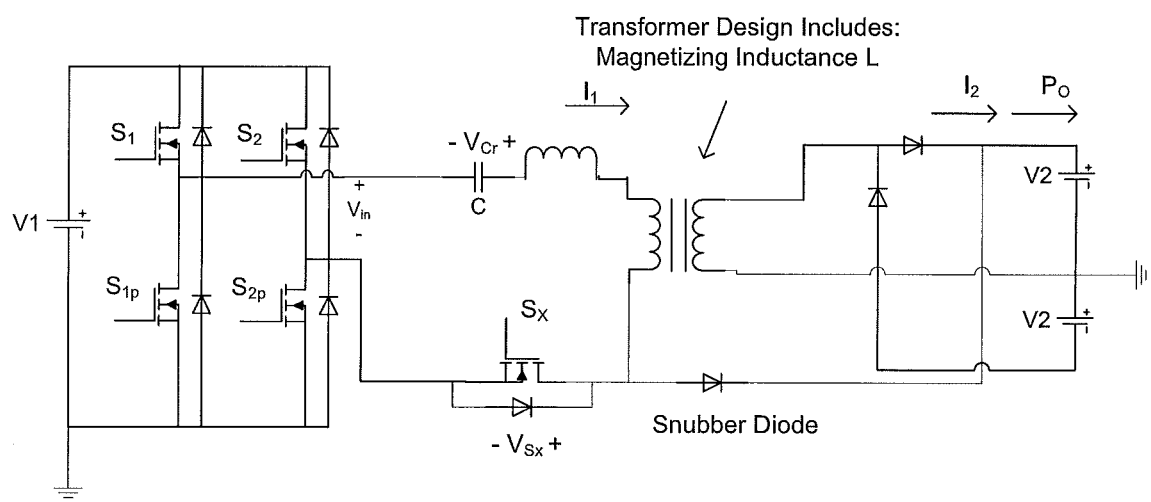
FIG. 12 is the implementation of FIG. 11d, using MOSFET switches, with the addition of a snubber diode.

As shown in FIG. 12, a circuit 48 may be one practical implementation of the circuit shown in FIG. 11c. The transformer magnetizing branch may provide the main resonant tank inductance "L". Through appropriate transformer design, the filter inductance "Lf" may also be integrated into the transformer. This may be done by designing the transformer to have leakage inductance of value "Lf". As shown in FIG. 12 all switches may be implemented using MOSFETs. A snubber circuit may be employed to limit the transient voltage across the high voltage MOSFET at the end of the conduction period. Provided the voltage V2 is lower than the voltage rating of the high voltage MOSFET, the snubber may consist of a single diode from the drain of the MOSFET to the positive output V2. This may allow energy normally lost in snubber circuitry to be transferred to the output, thereby yielding a near lossless snubber. This may improve overall converter efficiency.

Figure 13:
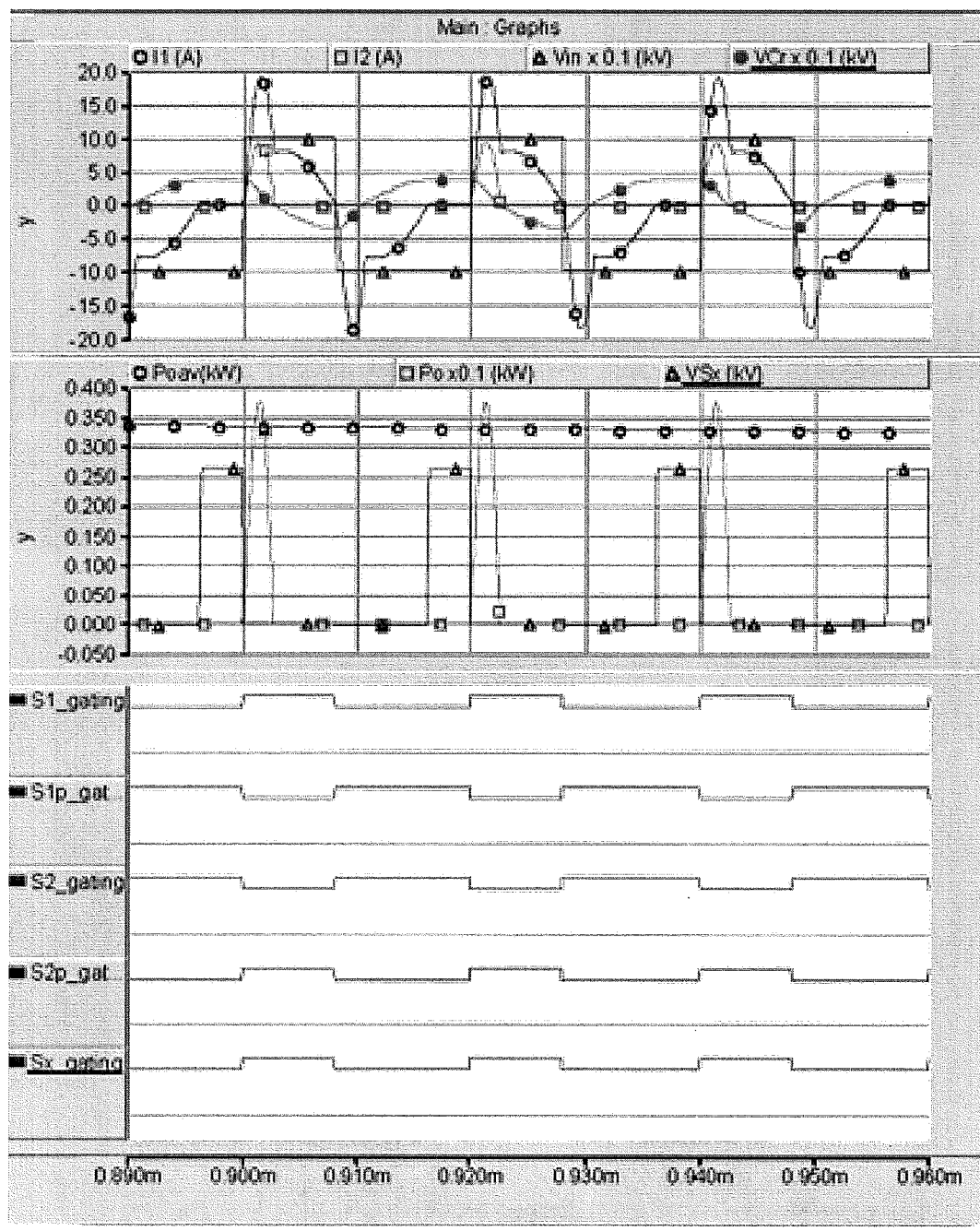
FIG. 13 illustrates the voltage and current waveforms associated in operation with the circuit of FIG. 12.

As shown in FIG. 13, embodiments of the present invention may produce particular results 50 that include gating signals for the converter of FIG. 12, together with the important voltage and current waveforms. The following is a description of a possible switching cycle method:

1. At time 0.900 ms the cycle may begins with the turn of on of switches S1, S2p and Sx. Thereafter energy may be transferred into the resonant tank as seen by the positive voltage Vin and positive tank input current I1.
2. When the tank current I1 reaches zero switches S1 and S2p may turn off, almost immediately after which switches S2 and S1p may turn on. This may cause the input voltage polarity to become negative at the same time that the current becomes negative.
3. Switch Sx may turn off at the same time as S1 and S2p, though the MOSFET body diode may allow conduction of the negative current. If losses in the MOSFET conduction channel are calculated to be lower than body diode conduction losses, then the MOSFET should be kept on for the duration of the negative current pulse to reduce conduction losses.
4. When the current reaches zero the switch Sx must be off. This may interrupt the tank current and allow the circuit to enter a near zero loss "hold state" where the converter operation is suspended and held in a near lossless state.
5. The duration of the hold state may be varied to control the amount of average power transfer from input to output. Following the hold state another similar cycle of operation may follow.

Transfer of power from the resonant tank to the output may occur twice per period, once to the positive dc output, once to the negative dc output. Power transfer to the positive output may take place immediately after the turn on of switches S1 and S2p. Power transfer to the negative output may take place immediately after the turn on of switches S2 and S1p.

In one embodiment of the present invention, a circuit may be provided consisting of a DC-AC converter followed by a (parallel) resonant tank with single controllable high voltage switch, followed by an AC-DC converter.

Figure 3A:
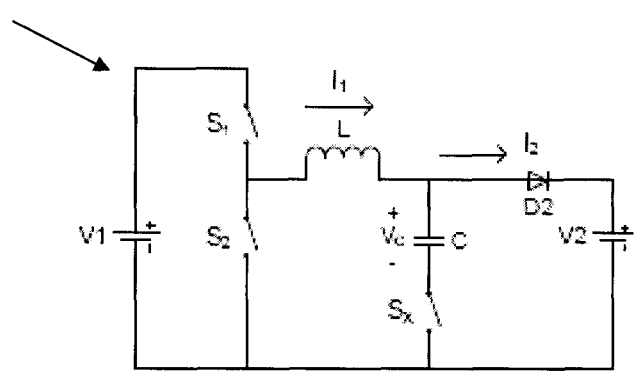
FIGS. 3a, 3b and 3c illustrate three representative implementations of the half-bridge resonant DC-DC converter of the present invention, having a single high voltage switch.
Figure 3B:
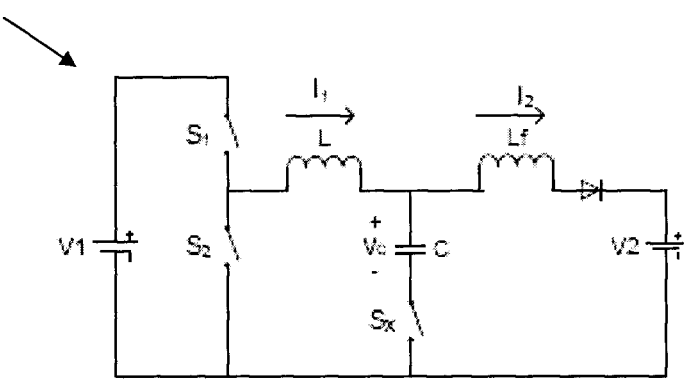
Figure 3C:
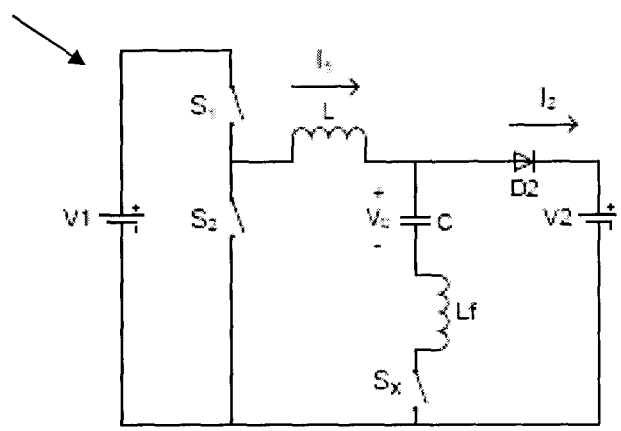

Embodiments of the present invention that includes the proposed "half-bridge floating tank" resonant DC-DC converter configuration, are shown in FIGS. 3a, 3b and 3c in three specific representative implementations. The embodiment of the present invention shown in FIG. 3a, may be a circuit 14 that does not include an output filter inductor. FIG. 3a illustrates the basic circuit design concept of the present invention, and presents a half-bridge floating tank converter in accordance with the present invention. The embodiment of the present invention shown in FIG. 3b may be a circuit 16 that includes an output filter inductor. For most implementations of the invention, it is a practical requirement to include a filter inductor. Generally speaking, there are two locations where it is convenient to add the filter inductor. The first is illustrated in FIG. 3b. The second is shown in FIG. 3c, which shows an embodiment of the present invention that may be a circuit 18 that includes a filter inductor integrated in the tank.

Figure 4:
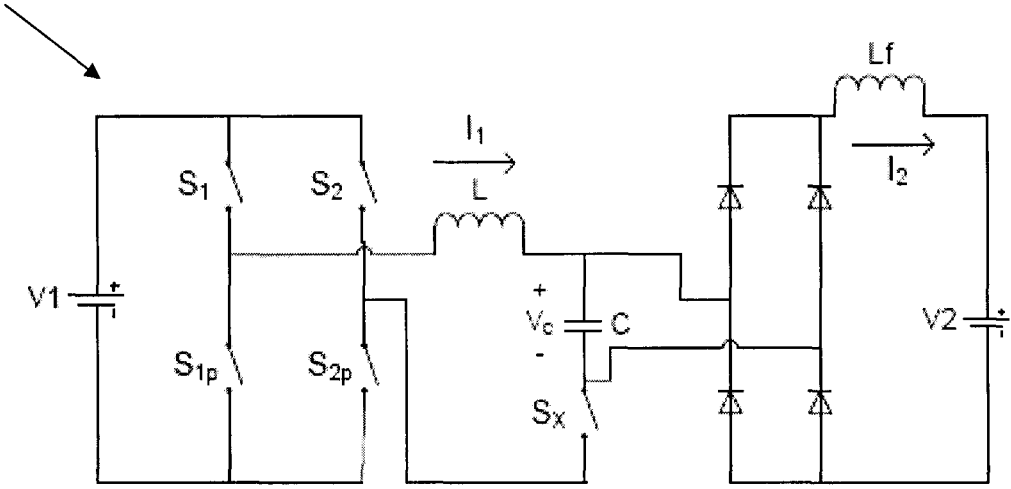
FIG. 4 is a circuit diagram illustrates an implementation of a full-bridge resonant DC-DC converter of the present invention, with a single high voltage switch.
Figure 5A:
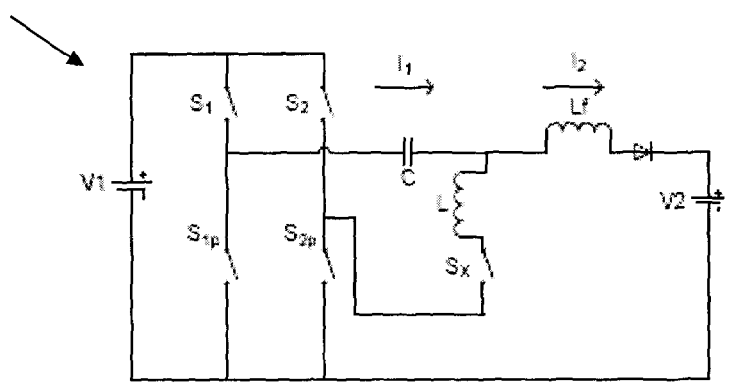
FIGS. 5a, 5b, 5c and 5d illustrate four representative implementations of the full-bridge resonant DC-DC converter of the present invention, having a single high voltage switch and a common ground on the input and the output.
Figure 5B:
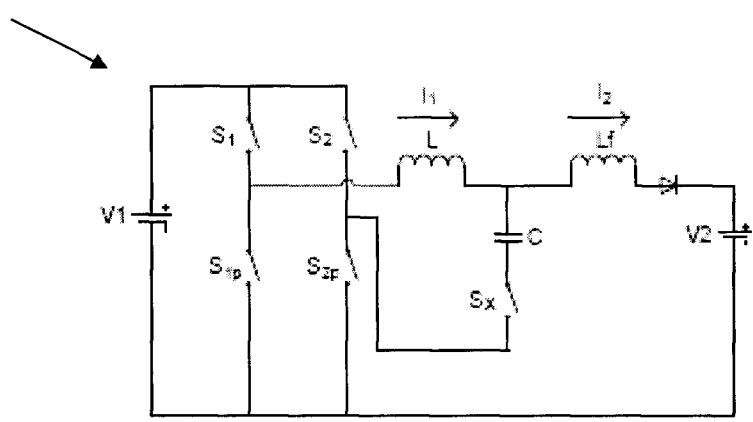
Figure 5C:
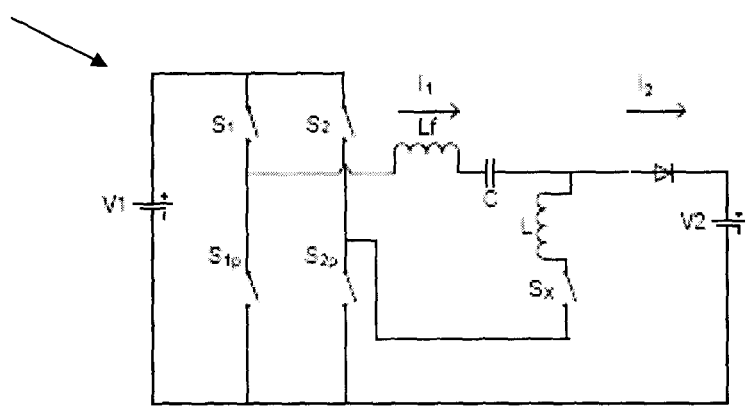
Figure 5D:
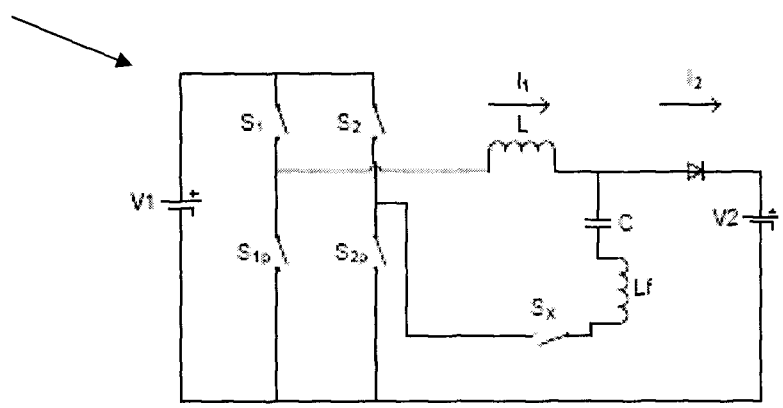

As shown in FIG. 4, in one embodiment of the present invention the circuit 20 may be a "full-bridge floating tank" configuration of the circuit design illustrated in FIGS. 3a, 3b, and 3c. FIG. 4 may be extension of the converter illustrated in FIGS. 3a, 3b and 3c. A skilled reader will recognize that the circuit 20 shown in FIG. 4, relative to the circuits 22, 24, and 26 shown in FIGS. 5a, 5b, 5c, and 5d respectively, for example, may lack a common ground on the input and the output and therefore may be undesirable for many transformerless applications. In embodiments of the present invention an isolation transformer may be added between the capacitor and the diode rectifier, to allow grounding of both the input and output voltage sources.

Embodiments of the present invention, as shown in FIGS. 5a, 5b, 5c and 5d, may represent variants of the full-bridge resonant DC-DC converter of the present invention, and may include a single high voltage switch, and a common ground for the input and the output. More specifically: the embodiment of the present invention shown in FIG. 5a, may be a circuit 22 wherein the inductor current may be switched by the single high voltage switch (Sx); the embodiment of the present invention shown in FIG. 5b, may be a circuit 24 wherein the capacitor current may be switched by the single high voltage switch (Sx); the embodiment of the present invention shown in FIG. 5c, may be a circuit 26 that is similar to the circuit 22 shown in FIG. 5a, and the circuit 26 shown in FIG. 5c may include an inductor current that may be switched by Sx and the filter inductor may be integrated into the tank; and the embodiment of the present invention shown in FIG. 5d, may be similar a circuit 28 that is similar to the circuit 24 shown in FIG. 5b, and the circuit 28 shown in FIG. 5d may include a capacitor current that may be switched by Sx and the filter inductor may be integrated into the tank.

It should be understood that the DC-DC converter of the present invention as shown in FIGS. 5a, 5b, 5c and 5d, relative to prior art full-bridge extensions of half-bridge circuits, may display a significant degree of asymmetry. In particular the asymmetry may be displayed in that the grounding is asymmetric, the input switch configuration is asymmetric, and the output stage is asymmetric.

A skilled reader will recognize that other variants and embodiment of the present invention are possible. For example an embodiment of the present invention may use emerging reverse block IGBT devices, in which case Sx may be eliminated, but S1 and S2 may each need to consist of a high voltage reverse blocking IGBT. Such an embodiment of the present invention may yield precisely the same voltage and current waveforms within the tank and output circuitry. Numerous other variations are possible.

In an embodiment of the present invention, the circuit design may be such that the high voltage switch needs not be reverse blocking, and thus MOSFETs or IGBTs may be used instead of, for example, thyrsitors (which limit switching frequencies to excessively low values), or MOSFET-series-diode/IGBT-series-diode combinations.

Also, in embodiments of the present invention, the circuit designs may use an electrically floating tank, as further explained below.

Certain aspects of the invention are explained in greater detail below, however these details should not be read as limiting the scope of the invention in anyway, but as examples of embodiments of the present invention.

Figure 6:
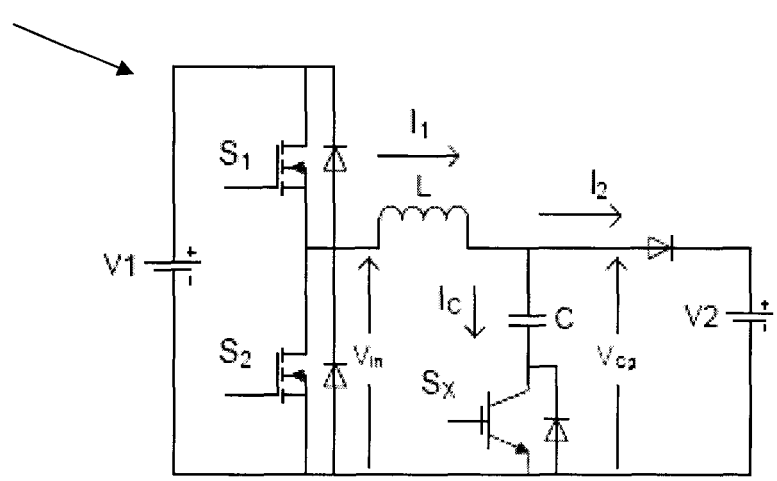
FIG. 6 is a specific implementation of the half-bride resonant DC-DC converter of FIG. 3a using a combination of MOSFET and IGBT switches.

The Half-Bridge Floating Tank Converter:

The half-bridge floating tank converter may be included in embodiments of the present invention. In such an embodiment of the present invention, the switching process may vary slightly based on the type of switches used and the location/orientation of the high voltage switch (Sx) within the tank circuit. A description of a possible switching process to be used in an embodiment of the present invention is provided herein with reference to a topology 30 wherein S1 and S2 are implemented using MOSFETS and Sx is implemented using a high voltage IGBT, as shown in FIG. 6.

Figure 7:
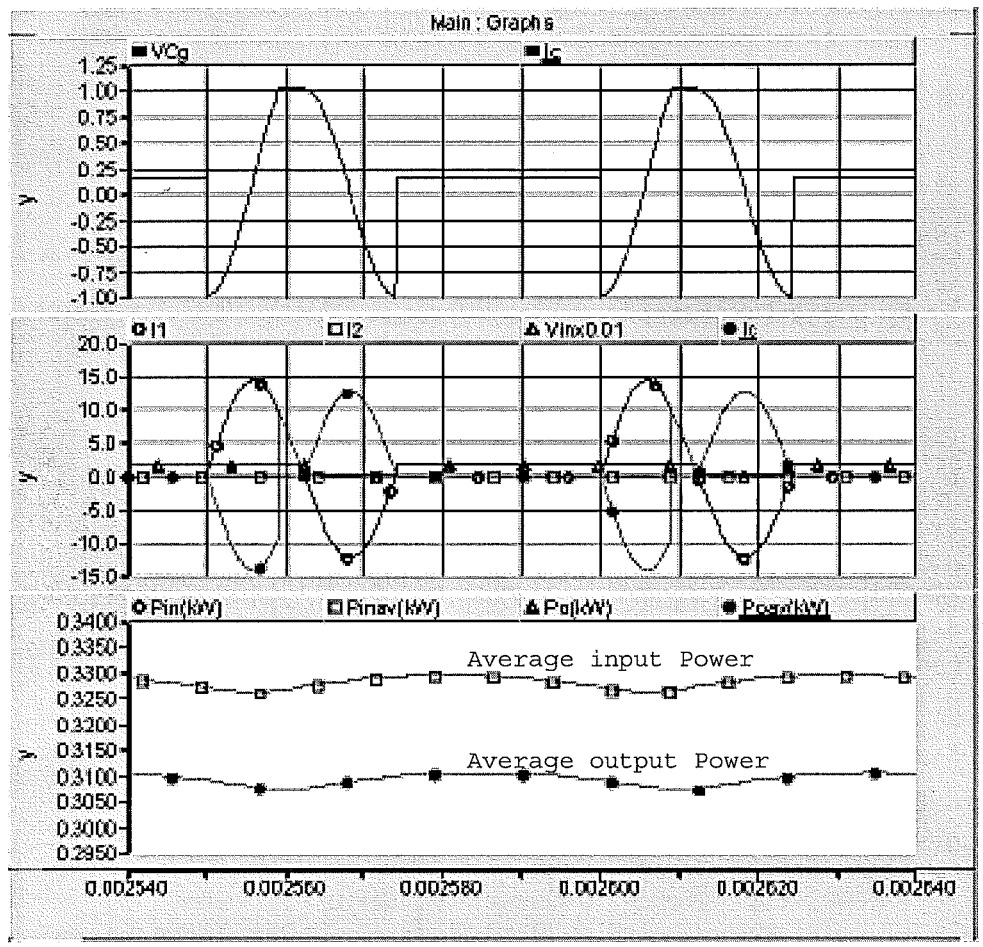
FIG. 7 illustrates the voltage and current waveforms associated in operation with the circuit of FIG. 6.

In one embodiment of the present invention, as shown in FIG. 7, waveform results 32 of use of the embodiment may show particular voltage and current waveforms associated with a half-bridge floating tank converter. For example, the converter may operate in a mode where the inductor current is not continuously oscillating but is interrupted, once each period, by the single high voltage switch, Sx.

An example of the operation of the circuit may be as follows:

1. S1 and Sx may fire to begin one cycle of LC resonant oscillation. For the given orientation of the IGBT (Sx), the initial condition on the capacitor voltage may be approximately −V2.
2. Current I1 may be positive and input voltage Vin may be positive for half a cycle, transferring energy into the circuit.
3. Once Vcg reaches V2, the output diode conductors and I1 may be transferred to the output, accomplishing output power transfer (the rapid rate of rise of the output current may be reduced through introduction of an additional current-rate-of-change limiting inductor placed either in series with the output diode or the tank capacitor).
4. At zero crossing of the input current S1 may be turned off and S2 may be turned on. The output diode may turn off at this time and the IGBT reverse conducting diode may turn on at this time. This allows the tank oscillation to continue, thereby recharging the capacitor to −V2, in preparation for the next cycle.
5. When the current I1 attempts again to go positive, the IGBT may be in an "off" state, thus interrupting the tank oscillation at a current zero crossing.
6. The circuit may then in a 'hold state' until a new pulse of energy is required.

The Full-Bridge Floating Tank Converter with Common Ground

Figure 8:
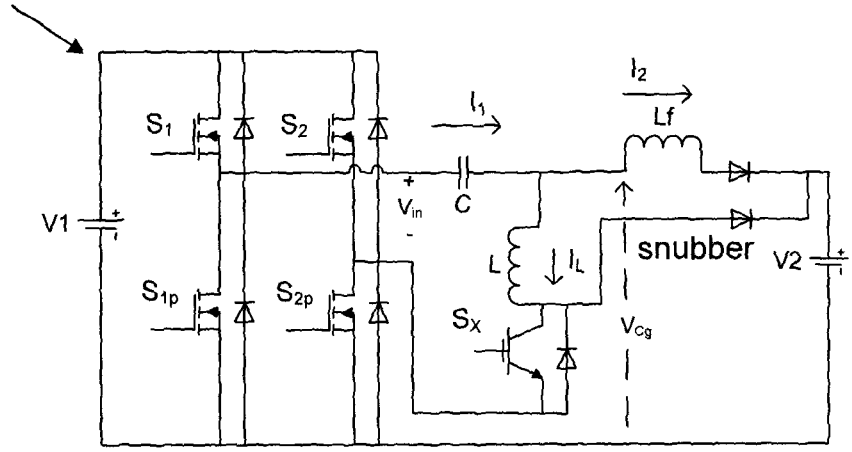
FIG. 8 is a specific implementation of the full-bridge resonant DC-DC converter of FIG. 5a using a combination of MOSFET and IGBT switches, with the addition of a snubber diode.

Embodiment of the present invention may include a full-bridge floating tank converter with common ground. In such embodiments of the present invention the switching process may vary slightly based on the type of switches used and the location/orientation of the high voltage switch (Sx) within the tank circuit. One embodiment of the present invention include a full-bridge floating tank converter with common ground may include a topology 34 where the four switches S1, S1p, S2 and S2p are implemented using MOSFETS and Sx is implemented using a high voltage IGBT, as shown in FIG. 8. In an embodiment of the present invention that includes a full-bridge floating tank converter with common ground, a snubber circuit may be employed to limit the transient voltage across the high voltage MOSFET at the end of the conduction period. The snubber may consist of a single diode from the collector of the IGBT to the output. This may allow energy normally lost in snubber circuitry to be transferred to the output, thereby yielding a near lossless snubber. Such embodiments of the present invention may improve overall converter efficiency.

Figure 9:
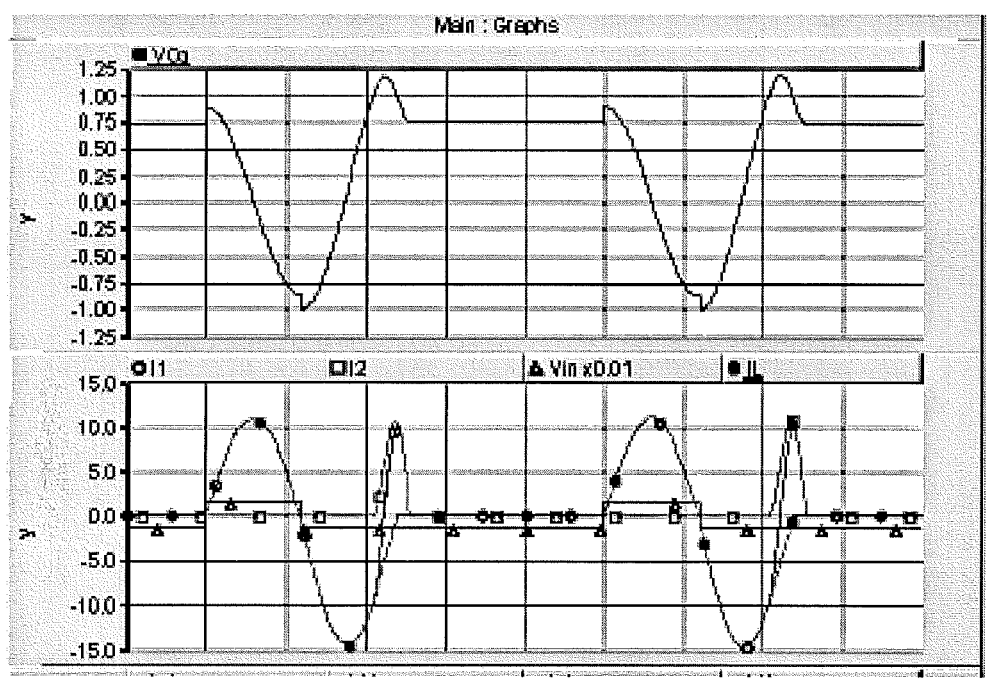
FIG. 9 illustrates the voltage and current waveforms associated in operation with the circuit of FIG. 8.

In one embodiment of the present invention, as shown in FIG. 9, waveform results 36 of use of the embodiment may show particular voltage and current waveforms associated with this a full-bridge floating tank converter with common ground. The converter may operate in a mode where the inductor current is not continuously oscillating but is interrupted, once each period, by the single high voltage switch, Sx.

An example of the operation of the circuit may be as follows:
1. For the given orientation of the IGBT (Sx), S1, S2$p$ and Sx may fire to begin one cycle of LC resonant oscillation.
2. Current I1 may be positive and input voltage Vin may be positive for half a cycle, transferring energy into the circuit.
3. When I1 crosses zero S1, S2$p$ may turn off and S2 and S1$p$ may turn on. Sometime during negative I1 the switch Sx may be turned off losslessly since the current is flowing in the anti-parallel diode.
4. When Vcg reaches V2 power may begin being transferred to the output. This may continue until the current I2 decays to zero.
5. Capacitor voltage may then be in a 'hold state' until a new pulse of energy is required.

The Full-Bridge Converter with Common Ground and Silicon Carbide Devices

Embodiment of the present invention may include a full-bridge floating tank converter with common ground that is operable to transfer energy during both positive and negative half cycles of the tank current, without use of a transformer, while maintaining a common ground on input and output, as required for many applications. The purpose of Sx in this circuit may be to achieve zero current/zero voltage switching while still offering control over the amount of power transfer. Thus near zero switching loss may be achieved while simultaneously maintaining control over the amount of power transfer.

As silicon carbide switching devices become more cost effective it may eventually become worthwhile to eliminate Sx. Nonetheless, a common ground arrangement capable of transferring energy during both positive and negative half cycles of the tank current may still be desired. The circuit topologies 38 and 40 of FIGS. 10$a$ and 10$b$ accomplish this. These topologies may be related to the circuit designs shown in FIGS. 5$a$ and 5$c$. As silicon carbide devices may offer greatly reduced switching losses (esp. the elimination of diode reverse recovery current), maintaining zero current/zero voltage switching may be sacrificed without negatively impacting efficiency. Power transfer may then be achieved via frequency control, as is common in other resonant converters, see: R. Erickson, D. Maksimovic, "Fundamentals of Power Electronics," Kluwer Academic Publishers, 2001.

The full-bridge converter with common ground may offers important benefits compared to the conventional resonant converters as outlined in R. Erickson, D. Maksimovic, "Fundamentals of Power Electronics," Kluwer Academic Publishers, 2001. Specifically the topology of an embodiment of the present invention that includes a full-bridge converter with common ground may offer common ground on input and output along with a high step-up ratio and may offer power transfer into the tank during both positive and negative half cycles of the tank current.

As examples of embodiments of the present invention and the benefits that these offer over the prior art, benefits of particular features of two principal circuit arrangements (a half-bridge floating tank converter, and a full-bridge floating tank converter with common ground) over the prior art are described below. A skilled reader will recognize that the features and benefits discussed below are merely provided as examples, and other embodiments and benefits are also possible.

The Half-Bridge Floating Tank Converter:

Embodiments of the present invention that include a half-bridge floating tank converter may offer particular benefits over the prior art. Some of these benefits include the following:
1. In comparison to the circuit of A. Abbas, P. Lehn, "Power electronic circuits for high voltage dc to dc converters," University of Toronto, Invention disclosure RIS#10001913, 2009-03-31, or that of D. Jovcic, "Step-up MW dc-dc converter for MW size applications," Institute of Engineering Technology, paper IET-2009-407, the half-bridge circuits of the present invention may only use one high voltage device, labelled: Sx. Furthermore Sx may not need to be a reverse blocking device.
2. A single high voltage switch may be operable in embodiments of the present invention to interrupt the resonant operation of the converter, thereby controlling energy transfer.
3. S1 and S2 may be implemented in embodiments of the present invention using only low voltage components, reducing losses.
4. In comparison to the invention of B. Buti, P. Bartal, I. Nagy, "Resonant boost converter operating above its resonant frequency," EPE, Dresden, 2005, embodiments of the present invention may only require a single source and single tank inductor.
5. Embodiments of the present invention may provide zero current/zero voltage switching of the input AC/DC converter.

The Full-Bridge Floating Tank Converter with Common Ground

Embodiments of the present invention that include a full-bridge floating tank converter with common ground may offer particular benefits over the prior art. Some of these benefits include the following:
1. In comparison to the circuit of A. Abbas, P. Lehn, "Power electronic circuits for high voltage dc to dc converters," University of Toronto, Invention disclosure RIS#10001913, 2009-03-31, or that of D. Jovcic, "Step-up MW dc-dc converter for MW size applications," Institute of Engineering Technology, paper IET-2009-407, the circuit of embodiments of the present invention may operate using only one high voltage device, labeled Sx, as shown in FIGS. 3$a$, 3$b$, 3$c$, and 3$d$. Furthermore Sx may not need to be a reverse blocking device.
2. In comparison to the circuit of P. Lehn, "A low switch-count resonant dc/d converter circuit for high input-to-output voltage conversion ratios," University of Toronto, Invention disclosure RIS#10001968, 2009-08-13, or the half-bridge circuit of the present invention, the full-bridge DC-DC converter of embodiments of the present invention may provide roughly double power transfer since energy may be transferred from the source into the tank during both positive and negative half cycles of the tank current.

3. Embodiments of the present invention may provide zero current/zero voltage switching of the input ac/dc converter.
4. In embodiments of the present invention common ground may be provided between the input voltage source and output voltage source.
5. In embodiments of the present invention a single high voltage switch may be operable to interrupt the resonant operation of the converter, thereby controlling energy transfer.

A skilled reader will recognize that numerous implementations of the technology of the present invention are possible. The circuit designs of embodiments of the present invention may present a modular structure and therefore components may be added or removed, while providing the functionality of the design, as described above. For example, particular embodiments of the DC-DC converter of the present invention may be transformerless. In other embodiments of the present invention it may be desirable to include a transformer in the circuit, such as the circuit shown in FIG. 4. For example, a transformer could be included between either the resonant tank inductor or resonant tank capacitor and the diode rectifier in the circuit shown in FIG. 4. Also, while use of Sx is described for some embodiments of the present invention, this component may be eliminated by, for example, using emerging reverse block IGBT devices, where S1 and S2 would each need to consist of a high voltage reverse blocking IGBT.

A skilled reader will recognize that in embodiments of the present invention specific aspects of the topologies described and shown herein may be modified, without departing from the essence, essential elements and essential functions of the topologies. For example, in the circuit design 42 shown in FIG. 11($b$), if Lf and C are in series with no midpoint, it may be possible to swap Lf and C. Similarly, when used with a transformer, any number of known output winding and rectifier configurations may be applied to achieve the same objective.

Figure 10A:
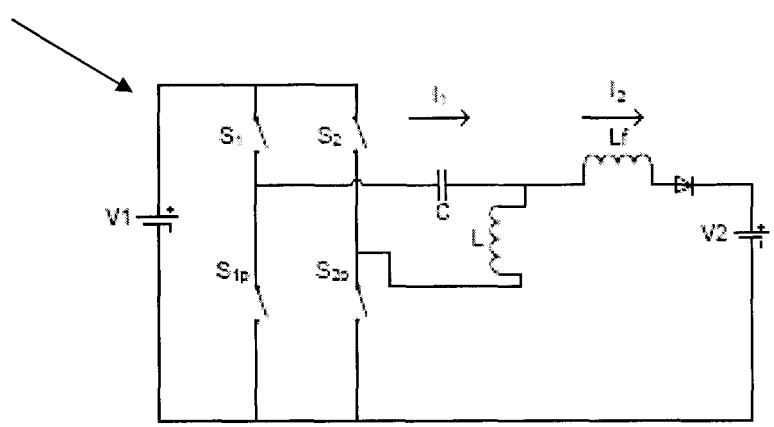
FIGS. 10a and 10b are circuit diagrams illustrating alternate implementations of the full-bridge resonant DC-DC converter of the present invention, with a common ground for the input and the output, but without a high voltage switch.
Figure 10B:
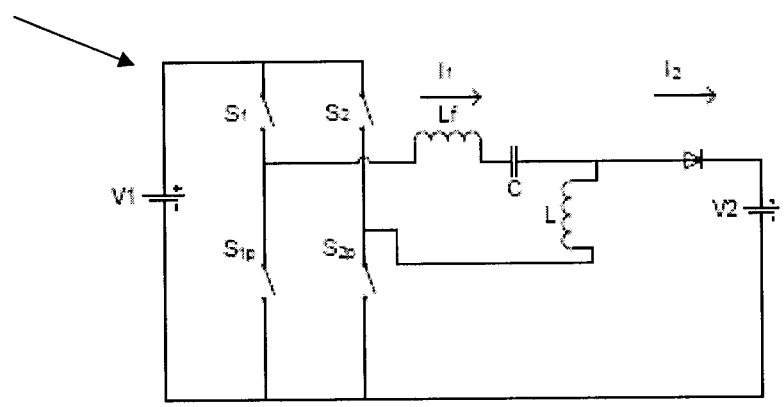

In one embodiment of the present invention the switching elements, for example as shown in the FIG. 10($b$) may employ silicon carbide devices. Switching may be carried out to provide a square wave voltage switching between +V1 and −V1 to the tank circuit. The switching carried out to provide a square wave voltage may be switching between +V1 and 0 (or between 0 and −V1) to the tank circuit. Tank input voltage switching may occur between +V1 and −V1 when operating near rated power and between +V1 and 0 (or between 0 and −V1) under low power. Alternatively, the elements recited in this paragraph may be used in a topology where the inductor Lf is moved to the output path (such as is shown in FIG. 10$a$).

It will be appreciated by those skilled in the art that other variations of the embodiments described herein may also be practiced without departing from the scope of the invention. Other modifications are therefore possible. A skilled reader will recognize that there are numerous applications for the DC-DC converter technology described. The DC-DC converters of the present invention may provide an efficient, low cost alternative to numerous components providing high input-to-output voltage conversion. Moreover, DC-DC converters with high amplification ratios that are embodiments of the present invention may be used to create a fixed voltage DC bus in renewable/alternative energy applications.

The invention claimed is:

1. A resonant dc-dc converter, comprising:
   (a) a low voltage full-bridge or half-bridge dc-ac converter coupled to an input dc voltage at an input terminal of the dc-dc converter;
   (b) a resonant tank coupled to the dc-ac converter;
   (c) a high voltage ac-dc rectifier coupled to the resonant tank, and having an output terminal of the dc-dc converter; and
   (d) a controllable switch within the resonant tank, said controllable switch being controllable to periodically alternate between a first state and a second state and to periodically discontinue tank oscillation in the resonant tank by causing the converter to enter a hold state while the controllable switch is in the first state, and thereby periodically suspending power transfer by the dc-dc converter to control a rate of power transfer from the input terminal to an output terminal;
   wherein the hold state is caused by operating the controllable switch in a non-conducting state.

2. The resonant dc-dc converter of claim 1, wherein the controllable switch only blocks current in one direction.

3. The resonant dc-dc converter of claim 2, wherein the controllable switch has no reverse blocking characteristic.

4. The resonant dc-dc converter of claim 2, wherein a lossless snubber circuit is introduced to the resonant dc-dc converter by connecting a diode from either: (a) a drain of the controllable switch that is a high voltage MOSFET; (b) a collector of the controllable switch that is an IGBT; or (c) an anode of the controllable switch that is a thyristor; to an output terminal of the resonant dc-dc converter.

5. The resonant dc-dc converter of claim 4, wherein the lossless snubber circuit includes at least a diode connected from a transistor terminal of the controllable switch to a positive terminal of the output terminal of resonant dc-dc converter, the diode permitting energy transfer from the transistor terminal to the positive terminal.

6. The resonant dc-dc converter of claim 2, wherein the resonant dc-dc converter incorporates a transformer, said transformer being operable to provide electrical isolation between input and output.

7. The resonant dc-dc converter of claim 6, wherein an output rectifier is connected to be operable to provide bi-polar (positive, neutral and negative) dc output.

8. The resonant dc-dc converter of claim 1, wherein a lossless snubber circuit is introduced to the resonant dc-dc converter by connecting a diode of a terminal of the controllable switch to an output terminal of the resonant dc-dc converter, so that one or more voltage spikes are clamped across the controllable switch.

9. The resonant dc-dc converter of claim 1, wherein the controllable switch is controllable in synchronism with the low-voltage full-bridge or half-bridge dc-ac converter.

10. The resonant dc-dc converter of claim 9, wherein the controllable switch is controllable so that one or more switching events of the controllable switch occur at a zero crossing of current of the controllable switch.

11. The resonant dc-dc converter of claim 9 wherein one or more switching events of one or more dc-ac converter switches occur at a zero crossing of currents of the respective one or more dc-ac converter switches.

12. The resonant dc-dc converter of claim 9, wherein the controllable switch is controllable so that one or more switching events of the controllable switch occur at a zero crossing of voltage of the controllable switch.

13. The resonant dc-dc converter of claim 1, wherein duration of non-conduction of the controllable switch is variable to regulate power flow from input to output.

14. The resonant dc-dc converter of claim 1 wherein the controllable switch periodically discontinues tank oscillation in the resonant tank by alternating between conducting and non-conducting periods.

15. The resonant dc-dc converter of claim 14 wherein the durations of the conducting and the non-conducting periods of the controllable switch are variable to regulate power flow from input to output.

16. A resonant dc-dc converter comprising: (a) a low voltage dc-ac converter coupled to an input dc voltage; (b) a resonant tank coupled to the dc-ac converter at an input terminal of the dc-dc converter; (c) a high voltage ac-dc converter coupled to the resonant tank and having an output terminal of the dc-dc converter; and (d) a controllable switch within the resonant tank circuit being controllable to periodically alternate between a first state and a second state and to periodically discontinue tank oscillation in the resonant tank by causing the converter to enter a hold state while the controllable switch is in the first state, and thereby periodically suspending power transfer by the dc-dc converter to control a rate of power transfer from the input terminal to the output terminal; wherein the resonant dc-dc converter for high voltage step-up ratio is operable to provide one or more of the following: (i) a common ground plane for input and output; and (ii) a transformer between input and output; wherein hold state is caused by operating the controllable switch in a non-conducting state.

17. A resonant dc-dc converter comprising: (a) a low voltage dc-ac converter coupled to an input dc voltage at an input terminal of the dc-dc converter; (b) a resonant tank coupled to the dc-ac converter; (c) a high voltage ac-dc converter coupled to the resonant tank and having an output terminal of the dc-dc converter; (d) a controllable switch within a circuit of the resonant tank being controllable to periodically alternate between a first state and a second state and to periodically discontinue tank oscillation in the resonant tank by causing the converter to enter a hold state while the controllable switch is in the first state, and thereby periodically suspending power transfer by the dc-dc converter to control a rate of power transfer from the input terminal to the output terminal; and (e) a common ground plane for an input and output that does not require use of a transformer; wherein the hold state is caused by operating the controllable switch in a non-conducting state.

18. A dc-dc converter with a transformer, wherein the dc-dc converter with the transformer comprises: (a) a resonant tank; (b) a switch, controllable with a circuit of the dc-dc converter with a transformer to periodically perform high voltage blocking of resonance by maintaining a high voltage across the switch, thereby periodically alternating between a first state and a second state and periodically discontinuing tank oscillation in the resonant tank by causing the dc-dc converter to enter a hold state while the switch is in the first state, to periodically suspend power transfer by the dc-dc converter to control a rate of power transfer from the input dc voltage to an output dc voltage; (c) a converter on a low voltage side; and (d) an output rectifier on a high voltage side; wherein the hold state is caused by operating the switch in a non-conducting state.

19. A resonant dc-dc converter, comprising:
(a) a low voltage full-bridge or half-bridge dc-ac converter coupled to an input dc voltage;
(b) a resonant tank coupled to the dc-ac converter;
(c) a transformer coupled to the resonant tank;
(d) an output rectifier coupled to the transformer to provide bi-polar (positive, neutral and negative) dc output; and
(e) a controllable switch within the resonant tank, said controllable switch being controllable to periodically alternate between a first state and a second state and to periodically discontinue tank oscillation in the resonant tank by causing the dc-dc converter to enter a hold state while the controllable switch is in the first state, periodically suspending power transfer by the dc-dc converter to control a rate of power transfer from the input dc voltage to an output dc voltage; wherein the hold state is caused by operating the controllable switch in a non-conducting state.

* * * * *